W. V. TURNER.
FLUID PRESSURE BRAKE DEVICE FOR DOUBLE HEADING.
APPLICATION FILED MAY 16, 1910.
1,078,017.
Patented Nov. 11, 1913.
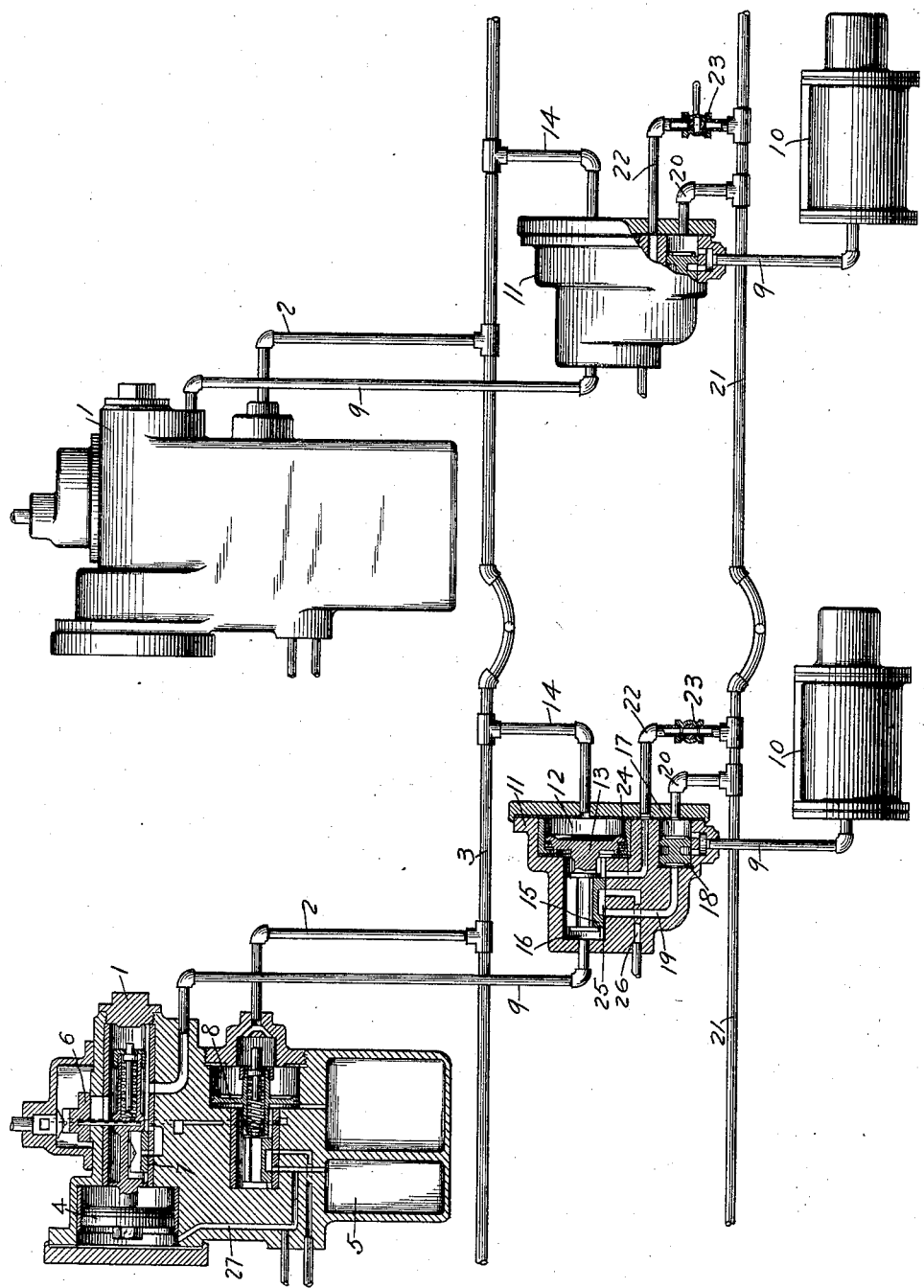
WITNESSES
INVENTOR
Walter V. Turner
by E. Wright
Att'y.
COLUMBIA PLANOGRAPH CO., WASHINGTON, D. C.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE-BRAKE DEVICE FOR DOUBLE-HEADING.

1,078,017.　　　　Specification of Letters Patent.　　Patented Nov. 11, 1913.

Application filed May 16, 1910.　Serial No. 561,677.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure-Brake Devices for Double-Heading, of which the following is a specification.

This invention relates to fluid pressure brakes, and more particularly to a brake apparatus for use in connection with what is known as double heading, or the employment of two or more locomotives, motor cars, or electric locomotives coupled up in a train. In such cases the brakes are usually controlled by manipulation of the brake valve on the head or leading locomotive and where a combined automatic and straight air brake equipment is employed, means have heretofore been provided whereby the automatic brakes on the second locomotive may be controlled by the brake valve on the head locomotive by varying the train pipe pressure in the usual manner.

The principal object of my invention is to provide means whereby the brakes on two or more locomotives, motor cars, or other power units coupled in a train may be controlled from one locomotive either by straight air or automatically.

Other objects and advantages will be referred to in the following more detailed description of my invention.

In the accompanying drawing the single figure is a diagrammatic view of the air brake equipment for two locomotives or motor cars coupled together, with my improvement applied thereto.

It may be stated at the outset that while my invention may be employed with various other types of combined automatic and straight air apparatus, the same is more particularly adapted to be employed in connection with a brake equipment having the feature of maintaining the brake cylinder pressure at any predetermined degree, such as the so-called ET equipment as shown in The Westinghouse Air Brake Company's instruction pamphlets Nos. 5025 and 5032.

According to this application of my invention, as shown in the drawing, a distributing valve device 1 is provided on each locomotive or motor car, having the usual branch pipe connection 2 to the train pipe 3. Each locomotive is provided with an engineer's automatic brake valve and an independent brake valve for controlling the operation of the distributing valve device, the latter comprising in its essential features, a movable abutment 4 subject on one side to brake cylinder pressure and on the opposite side to the pressure of an application chamber 5 for controlling a brake cylinder application valve 6 and brake cylinder release valve 7, and an automatic valve device 8 operated by variations in train pipe pressure for controlling the supply and release of air to and from the application chamber 5. The pressure in the application chamber may also be controlled by means of the independent brake valve, so that the brakes may be operated either automatically or by straight air.

The brake cylinder supply and release pipe 9 leads to brake cylinder 10, it being understood that all the brake cylinders on the locomotive may be connected to the pipe 9. Interposed in the pipe 9 is a valve device 11 comprising a casing having a piston chamber 12 containing a movable abutment 13 and connected to the train pipe 3 by a pipe 14. The abutment 13 operates a slide valve 15 contained in a valve chamber 16, the distributing valve end of the pipe 9 opening into said valve chamber. The casing also has a chamber 17 containing a double seating check valve 18 adapted in one seated position to open communication from a passage 19, leading to the seat of the slide valve 15, to the brake cylinder end of the pipe 9, and in its opposite seated position to open communication from a branch pipe 20 to the pipe 9. The branch pipe 20 opens into a pipe 21 adapted to be connected by the usual flexible connection to a second locomotive. A branch pipe 22, also connected to the pipe 21 and containing a cut-out cock 23, opens into a passage 24 leading to the seat of the slide valve 15. The slide valve 15 is provided with a cavity 25 adapted in the normal position of the valve to connect passage 19 with a passage 26 opening to the atmosphere.

In operation, the cock 23 on the locomotive from which the brakes are to be controlled, is opened and the other cocks 23 are closed. The movable abutment 13 is normally maintained at its inner position by train pipe pressure admitted through branch pipe 14. If it is desired to effect an application of the brakes the automatic engineer's brake valve may be manipulated to effect a reduction in train pipe pressure and thereby operate the automatic valve device 8 to supply fluid to the chamber 5 and through passage 27 to the chamber at the outer face of piston 4. The application valve 6 is then operated to supply fluid from the main reservoir to the pipe 9, whence the air flows through the valve chamber 16, passage 24, and pipe 22 to pipe 21 and thence through the branch pipes 20 on each locomotive to check valve chamber 17. The opposite side of the double check valve 18 is open to the atmosphere through passage 19 and cavity 25 in the slide valve 15, to atmospheric passage 26, so that the pressure of air flowing to the chamber 17 from pipe 20 maintains the check valve seated in the position closing the passage 19. Air consequently flows into the pipe 9 and thence to the brake cylinder 10 or the brake cylinders which may be connected to pipe 9. It will be noted that air is also supplied to the brake cylinders on the other locomotives connected to pipe 21 in the same manner. A straight air application may be effected by manipulation of the independent brake valve to supply air to the application chamber 5 and air is supplied to the locomotive brake cylinders as in the case of an automatic application. The brakes may be released in the usual manner either automatically or by operation of the independent brake valve, air from the brake cylinders on each locomotive flowing through pipe 21 and branch pipe 22 on the head locomotive to the distributing valve portion of the pipe 9.

During the usual operations of applying and releasing the brakes, the piston 13 is maintained at its inner position by train pipe pressure, but should the flexible hose between the units burst or should the train break in two, then the automatic portion of the distributing valve device on each locomotive is shifted to emergency position and full pressure is supplied to pipe 9 by the action of the piston 4. The brake cylinder pressure on the inner face of piston 13 then exceeds the excessively low train pipe pressure on the opposite face, and the piston 13 is consequently shifted on each locomotive, thereby closing passage 24 and opening passage 19 to valve chamber 16. Air is thereupon supplied to check valve 18, shifting the same to its position closing communication to pipe 20 and opening communication from passage 19 to the brake cylinder portion of pipe 9. Air is thus supplied to the brake cylinders in emergency on each locomotive by its own distributing valve and escape of air by the breaking of the pipe 21 is prevented by the action of the double check valve 18 seating to close the pipe 20.

It will now be apparent that by means of my improvement fluid under pressure may be supplied to and released from the brake cylinders on all the locomotives either independently or automatically by manipulation of the brake valves on one locomotive, while providing against loss of the brake in case of a break-in-two. Furthermore, upon a sudden reduction in train pipe pressure, fluid is supplied to the brake cylinders on each locomotive or motor car from the air supply on such locomotive.

Having now described my invention, what I claim as new and desire to secure by Letters Patent, is:—

1. In a fluid pressure brake, the combination with a train pipe, of a valve mechanism adapted to be operated both by a reduction in train pipe pressure and by other means for supplying air from a source of pressure to brake cylinders on a plurality of vehicles, and means for preventing loss of fluid from said brake cylinders upon a parting of the train.

2. In a fluid pressure brake, the combination with a train pipe, of a pipe line, a valve mechanism on one vehicle adapted to be operated both by a reduction in train pipe pressure and by other means for supplying fluid through said pipe line to a brake cylinder on another vehicle, and means for preventing loss of fluid from the brake cylinder upon breakage of said pipe line.

3. In a fluid pressure brake, the combination with a train pipe, of a pipe line, a valve mechanism on one vehicle adapted to be operated both by a reduction in train pipe pressure and by other means for supplying fluid through said pipe line to a brake cylinder on another vehicle, and means operating upon a parting of the train for supplying fluid to said brake cylinder and for preventing loss of fluid through said pipe line.

4. In a fluid pressure brake, the combination with two or more power units connected up in a train, a fluid pressure brake equipment on each unit having a valve for supplying air to the brake cylinder, a movable abutment subject to the opposing pressures of the brake cylinder and an application chamber, and means for supplying air to said application chamber, of means controlled from one power unit for supplying air from said power unit to the brake cylinders on all the power units.

5. In a fluid pressure brake, the combination with two or more power units connected up in a train, a fluid pressure brake equipment on each unit having a valve for supplying air to the brake cylinder, a movable abutment subject to the opposing pressures of the brake cylinder and an application chamber, and manually operated means for supplying air to said application chamber either by a reduction in train pipe pressure or directly, of means operating upon manipulation of the manually operated means on one power unit for supplying air from said power unit to the brake cylinders on all the power units.

6. In a fluid pressure brake, the combination with two power units coupled up in a train and each equipped with apparatus operated by a reduction in train pipe pressure for supplying fluid to apply the brakes, of a pipe line through which air is adapted to be supplied by manipulation of the apparatus on one unit to apply the brakes on the other power unit, and means operating upon a sudden reduction in train pipe pressure for closing communication through said pipe line.

7. In a fluid pressure brake, the combination with a plurality of locomotives connected up in a train, apparatus on each locomotive for controlling the brakes including a train pipe and brake cylinder, of a pipe line, means under the control of the engineer on one locomotive for supplying air through said pipe line to the brake cylinders on all the locomotives, and a valve mechanism operating upon a sudden reduction in train pipe pressure for closing communication from the brake cylinder to said pipe line.

8. In a fluid pressure brake, the combination with two power units connected up in a train and each equipped with a train pipe, brake cylinder and a valve device operated by variations in fluid pressure for controlling the brakes, of a pipe line through which air is adapted to be supplied from one unit to the brake cylinder of the other unit, a valve mechanism normally establishing communication from the pipe line to the brake cylinder on each unit and operating upon a sudden reduction in train pipe pressure to close communication from the brake cylinder to the pipe line and open communication for supplying air directly to the brake cylinder on each unit.

9. In a fluid pressure brake, the combination with a train pipe and brake cylinder, of a valve mechanism for controlling the supply of air to the brake cylinder, a brake cylinder supply pipe, a valve for controlling communication from the valve mechanism to the brake cylinder supply pipe, and a piston subject to train pipe pressure for operating said valve.

10. In a fluid pressure brake, the combination with a train pipe and brake cylinder, of a valve mechanism for controlling the supply of air to the brake cylinder, a brake cylinder supply pipe, a valve for controlling communication from the valve mechanism to the brake cylinder supply pipe, a piston subject to train pipe pressure for operating said valve, and a double check valve device normally affording communication from the brake cylinder supply pipe to the brake cylinder and adapted upon a sudden reduction in train pipe pressure to close communication between the supply pipe and brake cylinder.

11. In a fluid pressure brake, the combination with two or more power units connected up in a train and provided with apparatus for controlling the fluid pressure brakes, of means for supplying fluid from one unit to apply the brakes on the other power units in service and adapted upon a sudden reduction in train pipe pressure to close communication for supplying fluid from said unit and effect the direct supply of air to the brake cylinder on each unit.

In testimony whereof I have hereunto set my hand.

WALTER V. TURNER.

Witnesses:
Wm. M. Cady,
A. M. Clements.

Copies of this patent may be obtained for five cents each, by addressing the "Commissioner of Patents, Washington, D. C."